UNITED STATES PATENT OFFICE.

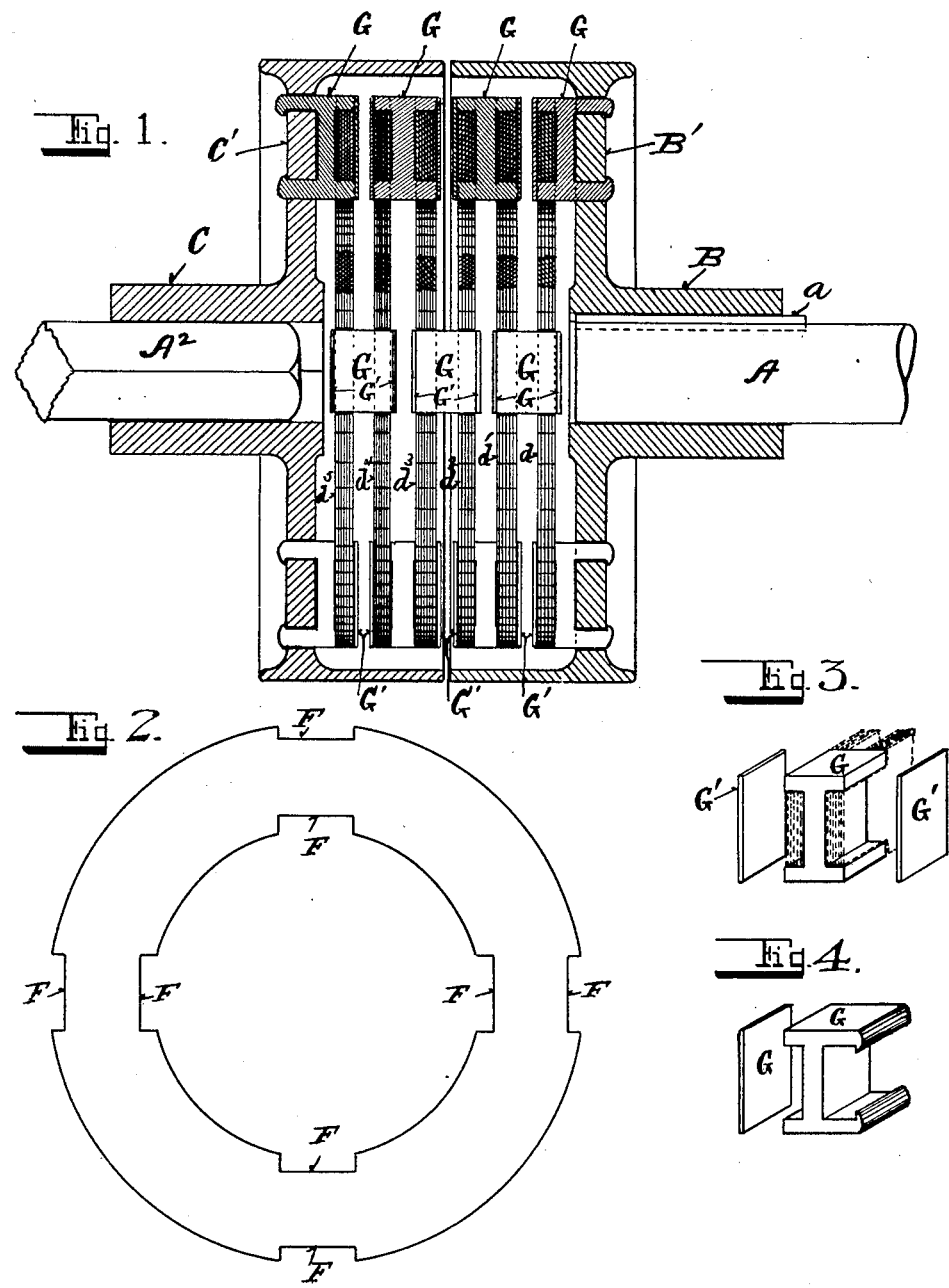

GEORGE H. THOMAS, OF WESTFIELD, NEW YORK, ASSIGNOR TO FLEXIBLE COUPLINGS COMPANY, OF WESTFIELD, NEW YORK, A CORPORATION OF NEW YORK.

UNIVERSAL JOINT.

1,389,915. Specification of Letters Patent. Patented Sept. 6, 1921.

Application filed May 6, 1918, Serial No. 232,819. Renewed January 7, 1921. Serial No. 435,759.

*To all whom it may concern:*

Be it known that I, GEORGE H. THOMAS, a citizen of the United States, residing at Westfield, in the county of Chautauqua and State of New York, have invented certain new and useful Improvements in Universal Joints; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to universal joints or flexible couplings for uniting the ends of rotative driving and driven members in a manner to transmit the turning movement while allowing a degree of mis-alinement of the axes of said members.

It is an object of the invention to provide an improved flexible coupling for the purpose mentioned which is strong in construction and efficient in operation and which can be manufactured at a reasonable cost.

It is a further object to provide an improved coupling embodying a plurality of flexible disk torque-transmitting members and improved means for uniting said members to each other and to driving and driven shafts.

Another object is to provide a reliable and efficient device of the character described which possesses features of structural superiority and functional advantage.

Other objects and advantages will appear hereinafter in connection with the following description of the accompanying drawing which illustrates a typical embodiment of the invention and wherein—

Figure 1 is a central section of a flexible coupling or universal joint;

Fig. 2 is a side elevation of one of the flexible disks thereof;

Fig. 3 is a detail perspective of one of the fastening means shown in Fig. 1; and Fig. 4 is a detail perspective of another of the fastening means.

Referring more particularly to the drawings, there is shown a rotary driving shaft A disposed in substantial alinement with a rotary driven shaft $A^2$. These shafts are flexibly connected by a coupling which includes a sleeve or hub B fixed to shaft A by a key $a$ and a sleeve or hub C suitably fixed to shaft $A^2$, for example, by having square or other non-circular bore which receives the square or complementary shaped end of the driven shaft. The coupling hubs B and C are provided on their adjacent ends with circular flanges B' and C', respectively, and are connected at a plurality of spaced and symmetrically disposed intervals to transmit the turning movement through a desired plurality of flexible disks $d$, $d^1$, $d^2$, $d^3$, $d^4$, $d^5$. As shown, the flexible disks each comprise a plurality of laminated thin metal rings, the leaves of each disk unit being superposed in registry and held together by circumferentially spaced fastening means which serve to transmit the turning movement, as indicated, from the shaft A and hub B to the disk $d$, thence to the disk $d'$ and in sequence to the disk $d^5$, the hub B and the driven shaft.

It is of especial importance in joints for the purpose above mentioned that the means which secure the disks to each other and to the terminal hubs be constructed in a manner whereby the holding function thereof is accomplished with a permanent rigidity. Accordingly by the present invention the disks $d$, $d^1$, etc. are provided at 90 degrees intervals with notched recesses F in their inner and outer edges. These recesses are disposed in pairs, the recesses of each pair being radially alined, and fastening means are provided by channel I-blocks G having a connecting heavy body wall which fits between and spaces adjacent disks and having the upper and lower cross flanges, respectively, snugly fitting the outer and inner notched recesses F in the metal annuli. Cover plates G' fit on the outer faces of the disks secured by block G and are welded or otherwise affixed to the complementary faces of the upper and lower flanges of the I-blocks. In practice the plurality of annuli comprising each disk unit are preferably positioned in the receiving recess of its respective spacing- and holding-blocks G under pressure and the plate G' then welded on so that a permanently tight and reliable union is effected. It will be noted that the torque transmission is substantially taken up by the inter-fit of the cross flanges of the blocks G and the notched recesses F in the annuli. Consequently the strain on the plates G' is relatively small. Furthermore, as the disks are notched both on their inner and outer edges a snug fit of the fastening and spacing blocks G serves to maintain the blocks in correct disposition radially of the turning axis of the joint and in permanent diametrical disposition.

As indicated, adjacent disks are secured to each other by the blocks G at diametrically opposite points and the fastening means of one pair are arranged at right angles to the fastening means of the next pair, that is, for example, the disks $d$, $d'$ are connected to each other on the horizontal axis (as shown), the disks $d'$, $d^2$ are connected together at the top and bottom, the disks $d^2$, $d^3$ are again connected to each other on the horizontal axis, etc. There is in consequence 90 degrees of each disk between adjacent fastening means free to flex and take up mis-alinement of the driving and driven shafts.

In the form shown, the terminal disks, that is, units $d$ and $d^5$ are respectively connected to the hubs B and C by the means shown in Fig. 4 comprising similar I-shaped blocks D provided with a cover plate G to bind the disk and having the other crosswalls projected through apertures in the flanges B' and C' and there riveted down or otherwise secured.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus fully shown and described my invention so as to enable others to utilize the same, what I claim as new and desire to secure by Letters-Patent is:—

1. In a device of the class described, a series of flexible rings, blocks to space said rings apart and means on said blocks to overlap the edges of said rings and secure said blocks in permanent diametrical position between said rings, substantially as set forth.

2. In a device of the class described, a series of flexible rings having key-seat notches cut in the peripheries thereof, I-shaped channel blocks between pairs of said rings with the upper flanges thereof resting in said notches and the base flanges thereof over-lapping the inner edges of said pairs of rings, and plates secured against said base and upper flanges and over-lapping said rings, substantially as set forth.

3. In a coupling, in combination, a rotative driving element, a metal annulus constituting a torque transmitting member arranged concentric to the axis of said element, and means to connect said element to said annulus including opposed notches on the inner and outer edges of said annulus and a block having a part abutting said annulus and having parts fitting said notches.

4. In a coupling for shafts, in combination, a pair of metal annuli constituting torque transmitting members, said members having recesses in their edges and means to connect said members comprising a block having a wall spacing said members and having flanges fitting said recesses, the fit of said flanges and recesses serving both to prevent relative movement between said members and between each member and said block.

5. In a flexible coupling for shafts, in combination, a laminated metal annulus constituting a torque transmitting member, said annulus having a pair of radially opposed notches on its inner and outer edges, and a common means to bind together the laminations of said annulus and to transmit drive thereto including a flanged block having a relatively heavy wall lying against said annulus and having right angled projecting walls snugly fitting said notches and having means to press said annulus against said first mentioned wall.

In testimony whereof I affix my signature.

GEORGE H. THOMAS.